March 10, 1970　　　　　　J. F. JACKSON　　　　　　3,500,181
EDDY CURRENT FLAW DETECTION APPARATUS UTILIZING
A PLURALITY OF CIRCUMFERENTIAL SENSORS
Filed April 21, 1967　　　　　　　　　　　　　　　3 Sheets-Sheet 1

INVENTOR/S
JAMES F. JACKSON,

BY *Melville, Strasser, Foster and Hoffman*
ATTORNEYS

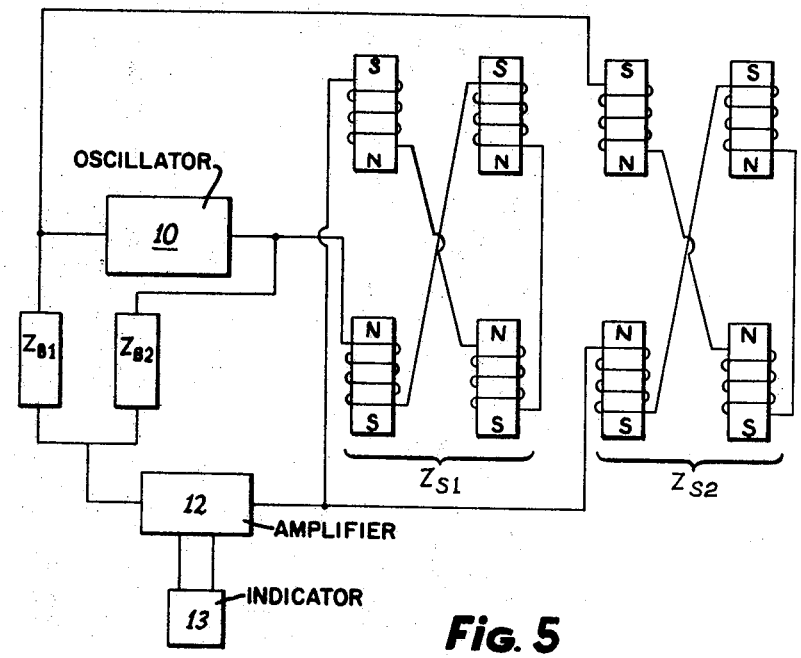
Fig. 5
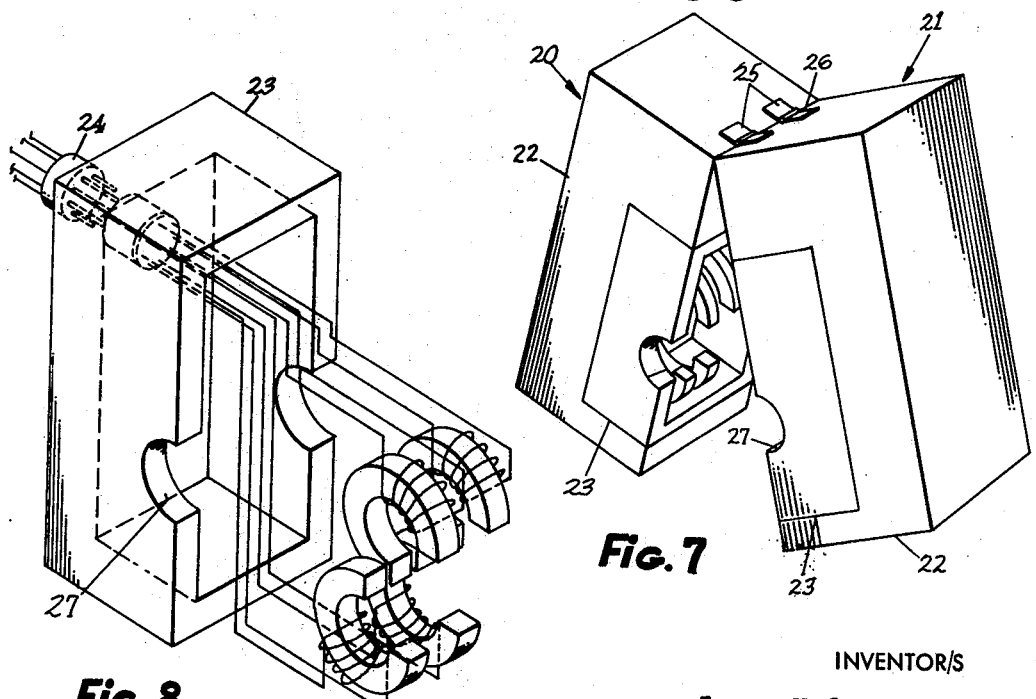
Fig. 7
Fig. 8
INVENTOR/S
JAMES F. JACKSON,

March 10, 1970 J. F. JACKSON 3,500,181
EDDY CURRENT FLAW DETECTION APPARATUS UTILIZING
A PLURALITY OF CIRCUMFERENTIAL SENSORS
Filed April 21, 1967 3 Sheets-Sheet 3

INVENTOR/S
JAMES F. JACKSON,

BY *Melville, Strasser, Foster and Hoffman*
ATTORNEYS

United States Patent Office 3,500,181
Patented Mar. 10, 1970

3,500,181
EDDY CURRENT FLOW DETECTION APPARATUS UTILIZING A PLURALITY OF CIRCUMFERENTIAL SENSORS
James F. Jackson, Franklin, Ohio, assignor to Armco Steel Corporation, Middletown, Ohio, a corporation of Ohio
Filed Apr. 21, 1967, Ser. No. 632,652
Int. Cl. G01r 33/12
U.S. Cl. 324—37                    11 Claims

ABSTRACT OF THE DISCLOSURE

This invention relates to a system for the detection of flaws in the entire surface of electrically conductive bodies such as wire, rods, cylinders or other elongated shapes. More particularly, the invention is concerned with the use of a transducer which comprises a plurality of spaced apart curved di-polar wound cores. The transducer in the system generates an electromagnetic field about the conductive body, which in turn induces eddy currents in said body disposed in close proximity to the wound cores. The system is arranged such that in its operative condition, it detects and responds to changes in the electrical impedance of the transducer caused by flawed region moving in relationship to said transducer.

Background of the invention

This invention, as will be apparent by the description to follow, was developed primarily for the detection of minute flaws in the aluminum coating on carbon steel wire. However, it should be understood that the system is applicable to other and non-related products such as pipes, boiler tubes, etc. In the rapid production of continuous lengths of aluminum coated wire, minute flaws such as lumps, uncoated areas, and small cracks tend to go undetected when left to mere visual inspection. Further, production practice such as tying the ends of successive lengths of wire together with knots precluded the use of the encircling coil of the prior art, since the required distance between the conductive body and the coil is quite small. That is, while encircling coils provide inspection of 360° around the conductive body, they are satisfactory for inspecting only a discrete length. For the size of flaws contemplated herein, the signal resulting from the flaw is quite small such that any rapid change in distance between the detecting core and conductive body would more than over-shadow the signal produced by said flaw.

Accordingly, the prerequisites of an effective flaw detection system for a production line may be stated as follows:

(1) Inspection of full surface of workpiece,
(2) Precise control of the spacing between the transducer and workpiece,
(3) Ability of the system to operate without interruption to the production of material, or destruction of the transducer,
(4) Means of producing alarm when flaw is located,
(5) Ability to ignore harmless anomalies.

Heretofore, prior art attempts failed in at least one of the foregoing prerequisites.

It is therefore a primary object of this invention to provide a device whereby flaws may be detected at any location on the surface of electrically conductive solid bodies such as wire, rods, or other elongated shapes, on the exterior or interior surface of pipe, cylinders or other hollow bodies.

A further object of this invention is the provision of an improved transducer for use in a system for detecting surface flaws in an elongated electrically conductive body.

A still further object of the invention is the provision of an improved transducer for use in a system for detecting surface flaws in a continuous strand of wire which would not be destroyed by abrupt increases in cross section of said wire.

Another object of the invention is the extreme accuracy of results achieved by the use of a system employing the invention as taught herein.

An additional object of this invention is the adaptability of the transducer taught herein to be used with a variety of operational systems or circuitry arrangement.

Still a further object of this invention is the provision of means for realizing uninterrupted production of a processing line through the arrangement of the cooperating wound cores which have the ability to be quickly separated and rejoined.

Further advantages and objects of this invention will become more apparent to those skilled in the art, especially when read in conjunction with the description to follow.

Summary of the invention

The preferred detection system as taught herein consists of an oscillator, in the range of 500 c.p.s. to 100 kc.p.s., an amplifier, alarm circuits and devices, and an impedance bridge (Wheatstone bridge). This preferred system is based upon what is commonly known as the differential mode of operation. It will be understood by those skilled in the art that the physical arrangement of the wound cores may be employed in other ways such as the system employing what is commonly termed the absolute mode of operation. A third arrangement which, for purposes of illustration, may be defined as the three-coil operation, will be described hereinafter along with the former operations.

In the impedance bridge as known by the prior art, there are provided four impedances which form the arms of the circuit. Two adjacent impedances, connected as two arms of the circuit in series with the oscillator, comprise the transducer of this invention. The remaining two impedances, which form a balancing circuit, are arranged in parallel with the transducer impedances. The amplifier and alarm, on the other hand, are connected between the impedances comprising the transducer, and the remaining two balancing impedances.

With the foregoing set up, the impedances of the transducer radiate two respective oscillating electromagnetic fields at a frequency set by the oscillator. And, by exposing the electrically conductive workpiece in close proximity to said fields, eddy currents are induced therein. The flow of these eddy currents produces secondary fields which react with the respective primary radiated fields. This reaction results in a change in the electrical impedance of the transducer. The amount of reaction, and resultant electrical impedance, is proportional to the density and proximity of the respective induced eddy currents.

Barring any differences in workpiece dimensions and tolerances, the density of the two respective eddy current patterns are equal. Hence, the reactions produced by the eddy currents are equal and the impedance bridge is said to be in balance. If the workpiece, in close proximity to either of the impedances forming the transducer, changes in any manner, such as by a bare area on a coated body, or by a crack which will affect its ability to maintain a constant eddy current density, an unbalanced condition will occur in the bridge and the alarm circuits rendered operative. The alarm may be in the form of a bell to signal the presence of a flaw, a paint spray which automatically marks the irregularity, a recorder which records the flaw, or a combination thereof.

Brief description of drawings

FIGURE 5 is a simplified schematic diagram illustrating the circuitry of the embodiment shown in FIGURE 4.

FIGURE 7 is a perspective view illustrating, through a simplified schematic, the manner by which the transducer may be divided to accommodate changes in workpiece size.

FIGURE 8 is an enlarged exploded perspective view of a portion of the transducer housing illustrated in FIGURE 7.

Description of the preferred embodiments

Figure 1:
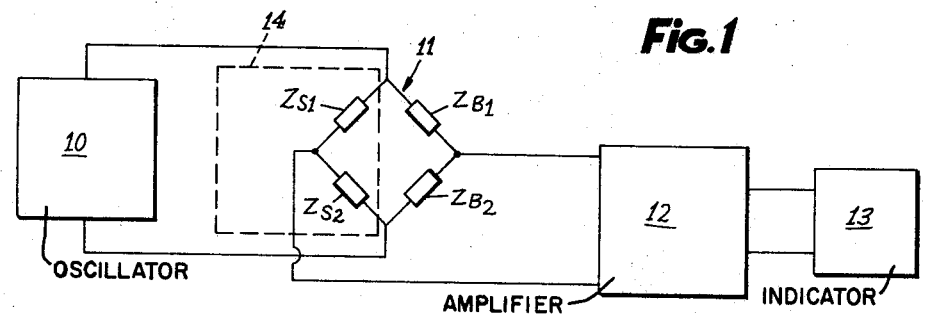
FIGURE 1 is a schematic circuit diagram of the preferred flaw detection system utilizing the transducer as taught herein.

Turning first to FIGURE 1, it will be observed that the preferred flaw detecting system of this invention comprises a high frequency oscillator 10 in the range of 500 c.p.s.–100 kc.p.s., an impedance bridge 11 coupled to the oscillator output, an amplifier 12, and appropriate alarm circuits and devices indicated generally at 13, all of which are connected as shown in FIGURE 1.

The impedance bridge 11, similar in operation and principal to the well known Wheatstone bridge, comprises four arms, each of which contains an impedance designated as $Z_{s1}$, $Z_{s2}$, $Z_{b1}$, and $Z_{b2}$. Forming a part of said impedance bridge 11 is transducer 14 containing impedance elements $Z_{s1}$ and $Z_{s2}$. It will become apparent from the description to follow that transducer 14 is a very important and critical part of the instant invention.

Transducer 14, as employed herein, comprises impedance elements $Z_{s1}$ and $Z_{s2}$. Each of said elements in the preferred embodiment is composed of four or more curved di-polar wound cores connected in series. While the type and size of cores will vary with the particular application for which the invention is used, one type found suitable for inspecting flaws in aluminum coated steel wire is the ferrite cores manufactured by Elna Ferrite Labs of Woodstock, N.Y. In the embodiment illustrated in the several figures, it is intended that each wound core cover or inspect a quadrant of the circular workpiece. To accomplish this result, the several cores, as supplied by the manufacturer, are cut into 270° horseshoe shaped cores. It should be apparent, especially to one skilled in the art, that if a greater or lesser surface area is to be inspected by a given wound core, or a non-circular constant cross-section workpiece is to be inspected, appropriate modifications may be made in the shape of the wound core to achieve the desired results. Accordingly, while the description for convenience will be directed toward the embodiment utilizing four 270° di-polar wound cores for each impedance element of transducer 14, it should be understood that the principle of the invention taught herein is applicable to different numbers and shapes of cores. A specific modification and the application thereof will be discussed in further detail hereinafter.

Figure 2:
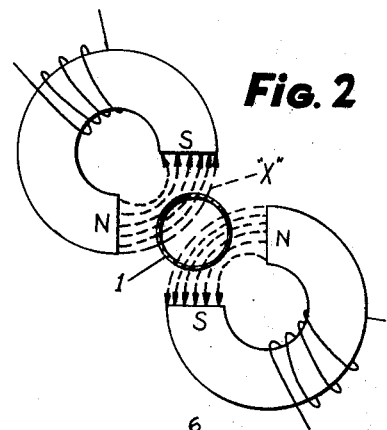
FIGURE 2 is an enlarged end view of one pair of wound cores which are used in constructing the transducer of this invention; said view further illustrates the relationship of the wound cores and the superimposed flux lines thereof to a workpiece.

For purposes of understanding, the several wound cores in the preferred embodiment illustrated in the figures will be designated: A, A', B, B', C, C', D and D'. Further, the wound cores with a common letter refer to the two wound cores in a given plane, taken transversely of the workpiece. FIGURE 2 is an end view of such a pair of wound cores. In the description above, it was indicated that the size of the workpiece will dictate in part the type and size of the wound cores. Therefore, with respect to the representation in FIGURE 2, the workpiece 1, which for purposes of illustration may be a 3/16 inch steel wire, coated with aluminum, may use a wound core whose outside diameter is approximately 5/16 inch, inside diameter 3/16 inch, and thickness 1/16 inch.

Figure 3:
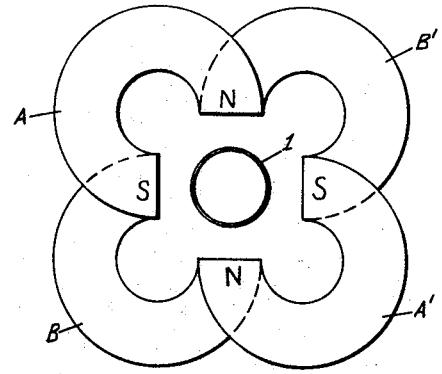
FIGURE 3 is an enlarged end view of the transducer showing the axial and radial displacements between adjacent pairs of wound cores.

By following the circuitry scheme to be described in more detail hereinafter, the direction of the current flow through each of the coils about the wound cores is such that the magnetic poles created at the ends of adjacent wound cores will interact in a favorable manner. That is, FIGURE 4 indicates that at any given moment, an N-pole is disposed next to an N-pole. It will be observed in FIGURE 3, which illustrates one embodiment of this invention, that the pole ends of the wound cores which have the same magnetic polarity coincide when viewed longitudinally. Finally, while the poles change polarity with each cycle of the oscillator 10, all poles reverse in unison, if wired in the prescribed manner, and the magnetic flux lines remain in the path X.

Figure 4:
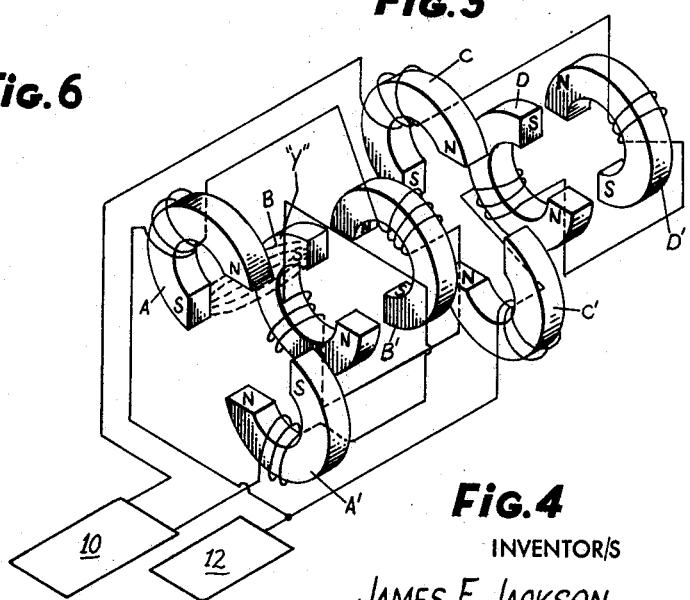
FIGURE 4 is a perspective view of one embodiment of a transducer utilizing eight C shaped wound cores.

FIGURE 4 is a perspective view showing the wiring of the transducer 14, while FIGURE 5 represents a simplified schematic of the wiring of the preferred detector system described herein. For such a system to be operative, there must be provided a workpiece 1 within the encircling arms of the several cores, A, A', B, B', C, C', D, and D'. Further, the workpiece must be capable of carrying an induced current. The high frequency of the oscillator 10 causes the phenomenon known as the "skin effect" to occur in the workpiece. This, coupled with a high conductivity material such as aluminum on the surface, causes the eddy currents to concentrate on the surface of the workpiece in the quadrant being inspected. Due to the preference of induced currents to concentrate at the surface of the workpiece, were a bi-metallic product such as aluminum coated steel wire or tubing is to be inspected, it is preferable to have the more conductive metal as the item being inspected.

The detector system contains a pair of series connected impedance $Z_{s1}$ and $Z_{s2}$ identified earlier as transducer 14. Said impedances, when energized by oscillator 10, radiate oscillating electromagnetic fields at a frequency set by the oscillator.

The impedances $Z_{s1}$ and $Z_{s2}$ are arranged in adjacent arms of a bridge circuit as previously noted. Two balancing circuits $Z_{b1}$ and $Z_{b2}$ are arranged to form the other arms of the bridge 11. It is the purpose of the balancing circuits, $Z_{b1}$ and $Z_{b2}$, to allow adjustment of the bridge for a condition commonly known as "balance." This condition is indicated by the absence of any voltage at the input of the amplifier 12. As taught in the prior art, the bridge will be in balance when the ratio of $Z_{s1}$ to $Z_{s2}$ is equal to the ratio of $Z_{b1}$ to $Z_{b2}$. In the preferred embodiment of this invention, all of the impedances, $Z_{s1}$, $Z_{s2}$, $Z_{b1}$ and $Z_{b2}$ are equal. As previously stated, the impedances $Z_{s1}$ and $Z_{s2}$ will remain equal when the eddy currents induced in the workpiece by each, are equal. When a disturbance occurs such as the passage of a flaw in the conductive workpiece, the eddy current patterns change and the impedances $Z_{b1}$ and $Z_{b2}$ change in value correspondingly. This causes an "unbalance" condition to occur in bridge 11, and a corresponding voltage now appears at the input of the amplifier 12. The amplifier 12 acts on this voltage and supplies the alarm circuits 13 with a proper activating signal. It has been generally observed that a given type of flaw has a characteristic effect on the impedance disturbances; therefore, it is possible through the use of a strip-chart recorder as part of the indicator, to record the flow of material and to detect the type of flaw by observing the magnitude of the flaw signals, as well as the frequency of reoccurrence.

While FIGURE 4 shows the direction of the windings, and therefore the direction of the current flow through each of the coils, FIGURE 5 may help to simplify understanding of same. It will be observed from this unique wiring scheme that the magnetic poles created at the ends of each of the wound cores will interact in a favorable manner. That is, similarly disposed poles of longitudinally adjacent wound cores are identical. Thus the interaction is such that the radiated magnetic fields are confined within the plane formed by opposing wound cores such as A and A', and forced inward towards the workpiece. This has been defined above as the path X. For example, if wound cores B and B' were incorrectly polarized such that a reversed polarity condition occurred, the magnetic flux lines would follow the path Y and only a small fringe field would be present in the area of the workpiece.

Figure 6:
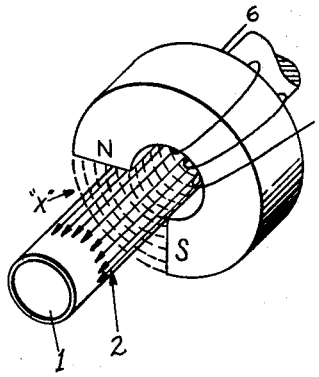
FIGURE 6 is an enlarged perspective view of one of eight identical wound cores comprising one embodiment of the transducer, in an operative condition.

By wiring and therefore polarizing in the prescribed manner, the flux lines are confined as shown in FIGURE 6. With this set-up, eddy currents 2 are produced. When an electrically conductive workpiece is placed within the area of the oscillating flux field X, current is caused to flow therein. The flow of these eddy currents produces secondary fields which react with the respect primary radiated fields according to Lenz's law. Said law has been defined as follows:

When an electromotive force is induced in a conductor by any change in the relation between the conductor and the magnetic field, the direction of the electromotive force is such as to produce a current whose magnetic fields will oppose the change.

The foregoing reaction results in a change in the electrical impedance of $Z_{s1}$ and $Z_{s2}$. The amount of reaction and the resultant change in electrical impedance is proportional to the density and proximity of the respective induced eddy currents.

In the preferred operation of this detection system, the electrically conductive workpiece 1 is caused to pass through the transducer 14. In the case of wire, a 6-roll straightener block (not shown), preceding the transducer, may be used to provide a stationary pass line for the workpiece. Other means, however, may be used to minimize movement relative to said transducer.

For inspecting a wire of 0.180 inch diameter, a core-to-wire clearance of 1/32 inch to 1/8 inch was found adequate to give the sought after results. It should be understood that the above noted clearance or tolerance is merely exemplary. The clearance should not be too small whereby the wound cores become clogged with dirt and coating metals. On the other hand, it must be close enough to induce current flow in the wire. Further, it should be apparent that as the sensitivity of the electronic elements increase, greater clearance may be provided in the unit. In any case, it is believed that with the foregoing considerations, one should have no difficulty in adjusting the unit for proper operation. In the preferred embodiment outlined above, the wound ferrite cores were wound with 40 turns of #38 magnet wire. With this set-up, each core was found to have an inductance of 50 microhenries and a resistance of 0.9 ohm with the oscillator 10 operating at 50 kc.p.s.

Returning now to the operation itself, assuming the material flows from right to left in FIGURE 4, the 0.180 inch wire enters the transducer between cores D and D'. If the 360° testing pattern is represented by the face of a clock, it will be observed that wound core D inspects the 6–9 quadrant, while wound core D' inspects 12–3. As the wire continues through the transducer, wound core C inspects the 9–12 quadrant and C' the 3–6 quadrant. This 360° inspection is duplicated by the impedance element $Z_{s1}$ (wound cores A, A', B, B'). If the distances, i.e., clearances between the wire and each of the impedance elements $Z_{s1}$ and $Z_{s2}$, remain constant, and if the densities of the two respective eddy current patterns are equal, the reactions produced by the eddy currents will be equal and the impedance bridge is said to be in balance. If the material under either element changes in any manner, such as by a crack which affects the ability to maintain a constant eddy current density, an unbalanced condition will occur in the bridge and the alarm indicator will be rendered operative.

Another unique feature of the transducer described herein is the ability of same to be moved from one location to another. It is often desirable to "spot check" the continuous products of two or more continuous processes, such as wire drawing machines, with the same piece of inspecting equipment. The disadvantage of the encircling coil of the prior art at once becomes apparent. Only when the continuity of the wire product is broken can such an encircling coil be inserted in, or removed from, the product pass line.

To effect the feature with the instant invention, the several wound cores are placed in one of two actuator arms 20 and 21, such as illustrated in FIGURE 7. It should be clear that variations may be made in the particular manner by which the separation of the two portions of the transducer is effected; nevertheless, FIGURES 7 and 8 represent an exemplary operative system. Each of said actuator arms comprises an outer housing 22, and a transducer block 23. FIGURE 8 is an enlarged exploded view of the transducer block 23. For example, in the embodiment illustrated, the four wound cores may be the group A, B', C and D', or A', B, C' and D. Returning again to the face-of-a-clock analysis, each group is found to inspect a different half of the workpiece. Since, as noted above, the wiring scheme is critical to the operation of the system, the correctness of same can be assured by means of a keyed 8-pin male plug 24.

The separation of the respective groups of wound cores may be effected by hinges 25 along a common edge 26 of the outer housings 22. In the alternative, the separation may be completed by moving in opposite radial directions. Further, it may be either manually or automatically triggered, such as by a rider on the workpiece placed adjacent the opening 27 of the transducer block 23. The clam-shell feature becomes even more significant in processing a multiplicity of successive strands of wire in a single operation. Typically, one strand is "tied" to the end of another. The resulting knot under normal circumstances could not pass through an encircling coil due to the tolerances imposed on the transducer. However, with the provision of means for separating the several cores, the continuous production of the wire is not interrupted, and the transducer is not destroyed.

Figure 9:
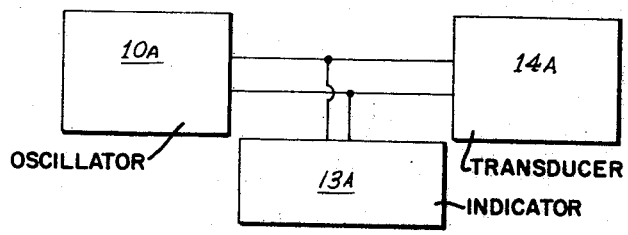
FIGURE 9 is a schematic circuit diagram of a second embodiment for a flaw detection system utilizing one arrangement of the wound cores for the transducer of this invention.

As indicated above, the arrangement of the wound cores, including the wiring thereof, is not restricted to use in what has been defined as the differential mode of operation. For example, FIGURE 9 illustrates schematically a second set-up employing what is known as the absolute mode of operation. This system utilizes only a single group of wound cores, such as the group A, A', B and B' for the transducer 14A. Further, the leads from transducer 14A go directly to the oscillator 10A, and the current flowing therethrough is monitored by the oscilloscope or meter 13A.

Figure 10:
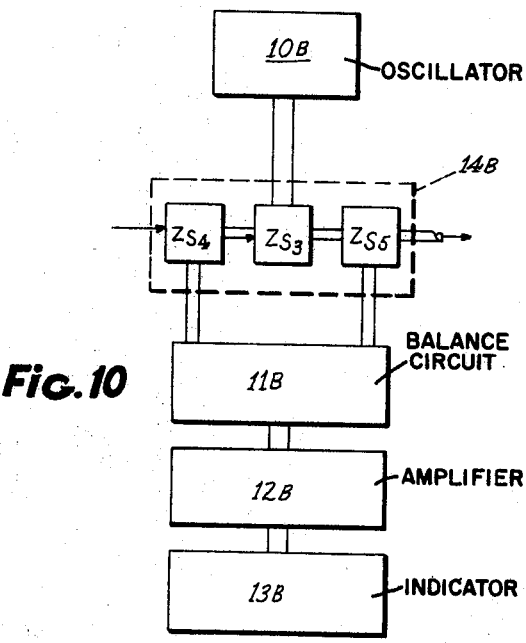
FIGURE 10 is a schematic circuit diagram of another embodiment for a flaw detection system utilizing a further arrangement of the wound cores for the transducer of this invention.

A third arrangement, called the three-coil operation, is shown schematically in FIGURE 10. With this arrangement of wound cores, a third group of wound cores is disposed intermediate the wound cores in FIGURE 4. That is, the transducer 14B now comprises three groups of wound cores aligned in the direction of the material flow. In the latter system, the middle group, which for purposes of illustration may be designated $Z_{s3}$ is directly connected to oscillator 10B in the manner shown. The other groups of wound cores, $Z_{s4}$ and $Z_{s5}$, are connected respectively to the balance circuit 11B, which in turn is connected to the amplifier 12B and alarm circuit 13B. In all of the systems taught herein, there is an element which generates the eddy current and the elements which detect same. In the particular arrangement shown in FIGURE 10, $Z_{s3}$ is an energizer which generates the eddy currents to be detected by $Z_{s4}$ and $Z_{s5}$. It should be apparent from the above that there is flexibility in the utilization of the wound cores as described herein.

Figure 11:
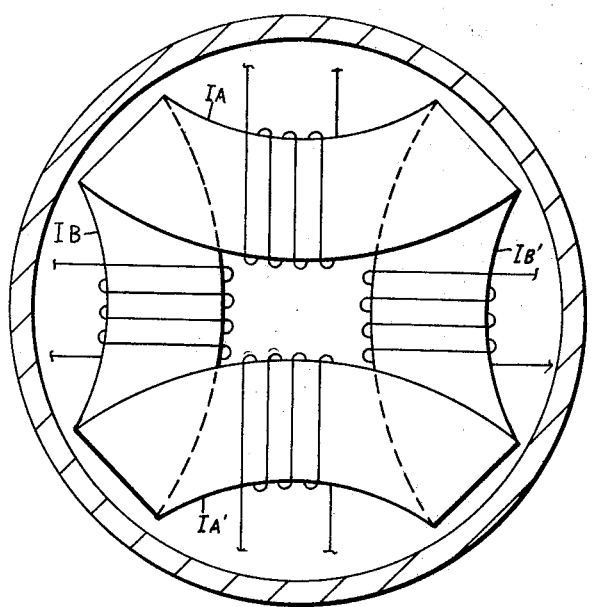
FIGURE 11 is a plan view similar to FIGURE 3 showing a different configuration for the wound cores, whereby the internal surface of a cylindrical object may be readily inspected.

The versatility of this invention is not limited to the systems empolying the wound cores. That is, the shape or numbers of wound cores in a particular group may be appropriately modified to meet the situation involved. For instance, FIGURE 11 illustrates one major modification for the wound core configuration. The wound cores in this case are arranged to inspect the I.D. of a tube, pipe, etc., for surface flaws. The wiring is the same as the O.D. inspection system illustrated in FIGURE 4. The wound cores, which may be designated IA, IA′, IB and IB′ are approximately one-quarter cores. This latter shape is not intended as a limitation to this invention as the number, and therefore shape, of wound cores may vary, especially where large diameter items are to be inspected. Accordingly, as modifications are contemplated by this invention, no limitations are intended to be imposed herein except as set forth in the appended claims.

The embodiments of the invention in which an exclusive property or privilege is claimed are defined as follows:

1. A system for detecting flaws in an axially moving electrically conductive body in the form of wire, rods, cylinders and other elongated shapes, comprising an electrical power supply of alternating current, an indicator, and an electrical circuit connected therebetween, said electrical circuit containing a transducer composed of at least two sets of electrically wound magnetic cores, each said set comprising at least two cores of arcuate shape and symmetrically arranged circumferentially about the line of travel of said moving body, each said set disposed in a different plane normal to said line of travel, and adjacent sets angularly displaced circumferentially from one another with the poles of the cores of each sets overlapping one pole of two different cores of an adjacent set in the axial direction, said cores having electrical windings thereabout to energize same, the electrical windings on said magnetic cores being connected in said electrical circuit and wound in such a way that at any given moment the magnetic polarity of the overlapping poles is the same.

2. The flaw detection system claimed in claim 1, wherein the arcuate magnetic cores are C-shaped and the arcuate extent of each said core is at least 90°, but less than 360°.

3. The flaw detection system claimed in claime 2, wherein the arcuate extent of each magnetic core is approximately 270°.

4. The flaw detection system claimed in claim 1, wherein each set of magnetic cores comprises a pair of magnetic cores.

5. The flaw detection system claimed in claim 4, including means for jointly moving one core of each said set relative to the remaining cores.

6. A transducer for use in electrical systems for the detection of flaws in a moving electrically conductive body in the form of wire, rods, cylinders and other elongated shapes, comprising at least two sets of arcuate magnetic cores circumferentially arranged symmetrically about the line of travel of said moving body, each said set lying in a separate plane normal to said line of travel and angularly displaced circumferentially from an adjacent set with the pole of the cores of each set overlapping one pole of two different cores of an adjacent set in the axial direction, said cores having current carrying windings thereabout and joining each said core to at least one other core, the windings being so wound about the core that when current is caused to pass through said windings to energize said cores the magnetic polarity of the overlapping poles is the same.

7. The transducer claimed in claim 6, wherein each said set of cores is composed of a pair of cores.

8. The transducer claimed in claim 7, and composed of four sets of cores.

9. The transducer claimed in claim 7, wherein the arcuate magnetic cores are C-shaped and the arcuate extent of each magnetic core is at least 90°, but less than 360°.

10. The transducer claimed in claim 9, wherein the arcuate extent of each magnetic core is approximately 270°.

11. In combination, an electric circuit connecting an impedance bridge and an electric power supply, said impedance bridge comprising in part a transducer composed of at least two sets of magnetic cores having first and second pole faces, said cores disposed within current carrying windings which windings form part of the impedance of said bridge, each set of cores arranged circumferentially to define an uninterrupted path for moving an elongated body relative thereto, with each set arranged in a separate plane normal to said path, and adjacent sets angularly displaced from one another, with poles of the cores of each set overlapping one pole of two adjacent cores of an adjacent set in the axial direction of said path, the windings being so wound about the cores that when current is caused to pass through said windings to energize said cores the magnetic polarity of the overlapping poles is the same.

References Cited

UNITED STATES PATENTS

| 2,065,118 | 12/1936 | Davis. | |
| 2,889,513 | 6/1959 | Callan et al. | 324—37 |
| 2,980,850 | 4/1961 | Cochran | 324—37 |
| 3,029,382 | 4/1962 | Cochran et al. | |
| 3,234,457 | 2/1966 | Sower et al. | |
| 3,271,664 | 9/1966 | Mountz et al. | |
| 3,281,667 | 10/1966 | Dobbins et al. | |

FOREIGN PATENTS

| 594,158 | 11/1947 | Great Britain. |
| 631,987 | 11/1949 | Great Britain. |
| 641,732 | 8/1950 | Great Britain. |

RUDOLPH V. ROLINEC, Primary Examiner

R. J. CORCORAN, Assistant Examiner